Patented Nov. 6, 1928.

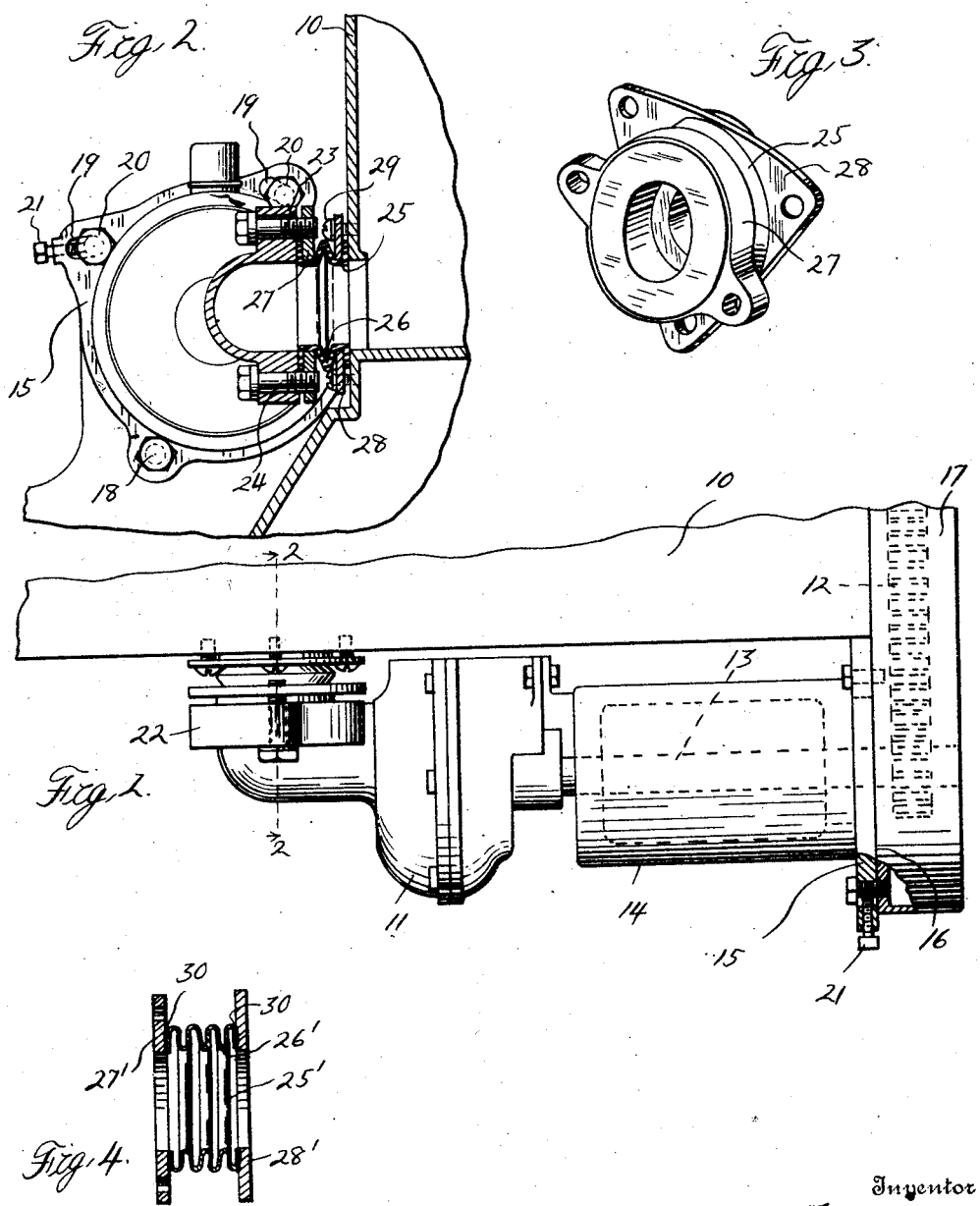

1,690,338

UNITED STATES PATENT OFFICE.

EDWIN R. EVANS, OF DETROIT, MICHIGAN.

PUMP CONNECTION.

Application filed September 8, 1925. Serial No. 55,200.

The invention relates to motor vehicles and refers more particularly to improved means forming a connection between the pump and the cylinder jacket.

One of the objects of my invention is to provide a connection of the character aforesaid which is of simple construction, cheaply manufactured and capable of ready assembly or replacement of parts. A further feature resides in providing a connection of a yielding or flexible character whereby the generator which is commonly carried as a unit with the pump may be readily adjusted for loosening or tightening the chain ordinarily provided for driving the generator and pump.

With these and other objects in view, the invention resides in the novel features of construction and combination and arrangements of parts as more fully hereinafter described and claimed.

Referring to the accompanying drawings in which like reference characters indicate corresponding parts—

Figure 1 is a plan view showing my invention applied to a cylinder water jacket;

Figure 2 is a sectional elevation view illustrating the parts forming the connection between the pump and water cylinder;

Figure 3 is a perspective view showing in detail one form of the parts and forming the pump and water cylinder connection;

Figure 4 is a longitudinal elevation view in cross section illustrating a modified construction of pump connection.

In the drawings reference character 10 represents a cylinder water jacket, 11 the water pump driven through a chain 12 and shaft 13. 14 is the generator also driven from the shaft 13. It is customary to drive both the water pump and generator through a common shaft and as shown in the drawings, to mount these members as a common unit. In order that the tension in the driving chain 12 may be regulated, it is desirable to provide means whereby the pump and generator unit may be moved so as to change the position of the shaft 13. Such an adjustment may be provided by forming the pump and generator unit with a flanged portion 15 adapted to be slidably adjustable against the face 16 of the housing for the chain 12. To this end the pump and generator unit may be pivotally connected to the chain casing 17 as shown at 18. The flange 15 may also be provided with the slots 19 cut on an arc about the pivot point 18 and adapted to receive the cap screws 20 which adjustably clamp the flange 15 to the face 16 of the chain casing 17. 21 are set screws for facilitating in the adjustment of the generator unit.

In operation of the parts as thus far described, when it is desired to effect an adjustment of the tension in the chain 12, the three cap screws indicated at 18 and 20 are loosened and the set screws 21 rotated to move the pump and generator unit the desired amount with respect to the chain casing 17. Then the cap screws are tightened to clamp the unit in a fixed position.

In order to accommodate for this adjustment of the generator it is apparent that some means must be provided for permitting relative movement between the water pump 11 and the cylinder water jacket 10. To this end I have formed the pump 11 with the terminal flange 22 provided with the bolt openings 23 accommodating the bolts 24. 25 indicates a conduit member forming the friction connection between the pump and cylinder water jacket. This member is preferably formed with one or more bellows-like or return-bent portions 26 for rendering the conduit member flexible. 27 is an end clamping disc engageable by the bolts 24 for clamping one end of the conduit member between the disc and pump flange 22. 28 is a second end clamping disc engageable by the fasteners 29 for clamping the other end of the conduit member between the cylinder water jacket and the disc 28. The conduit member 25 is preferably formed of a rubber-like or relatively thin copper material.

It will be noted that I have provided a simple means for forming a flexible conduit between the water pump and cylinder water jacket, this conduit permitting adjustment of the generator. It will further be noted that the parts may be readily assembled and when it is desired to renew the conduit member 25 the latter may be readily replaced by removing the end clamping discs 27 and 28.

Where the conduit member is formed of relatively thin copper, I may form this member as shown in Figure 4. In this figure the conduit member 25' may be provided as before with the bellows-like, or return-bent portions 26', the ends of the member 25' being soldered at 30 to the end clamping discs 27' and 28'. These end clamping discs as before, may be respectively attached to the pump flange and the cylinder water jacket.

While it is believed from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. The combination with a motor vehicle engine provided with a pump, a generator, and a cylinder water jacket, the said pump and generator being adjustable as a unit with respect to the cylinder water jacket, of a yieldable connection between said pump and jacket, the said connection including a collapsible conduit.

2. The combination with a motor vehicle engine provided with a pump, a generator, and a cylinder water jacket, the said pump and generator being adjustable as a unit with respect to the cylinder water jacket, of a connection between said pump and jacket, comprising a yielding conduit member and end clamping members adapted to respectively clamp the respective ends of the said member between the clamping members and the pump and jacket respectively.

3. The combination with a motor vehicle engine provided with a pump, a generator, and a cylinder water jacket, the said pump and generator being adjustable as a unit with respect to the cylinder water jacket, of a connection between said pump and jacket comprising a yielding conduit member, means for removably clamping one end of said member with said jacket, and means for removably clamping the other end of said member with said pump.

4. The combination with a motor vehicle engine provided with a pump, a generator, and a cylinder water jacket, of a pivotal mounting for the pump and generator whereby the two may be adjusted as a unit with respect to the cylinder water jacket, and a connection between the pump and the water jacket, the said connection including a flexible member permitting adjustment of the pump and generator about their pivot.

5. The combination with a motor vehicle provided with a pump, a generator, and a cylinder water jacket, of a pivotal mounting for the said pump, and generator whereby the two may be adjusted as a unit with respect to the cylinder water jacket, and a connection between the said pump and the said jacket including a collapsible, bellows-like conduit member permitting the movement of the said pump and generator toward and away from the said jacket.

6. The combination with a motor vehicle engine having a cylinder water jacket and provided with a pump and generator, of means for adjusting the pump and generator as a unit with respect to the cylinder water jacket, and means for detachably connecting the pump to the water jacket to form a conduit therebetween, the said means permitting movement of the pump relative to the water jacket.

In testimony whereof I affix my signature.

EDWIN R. EVANS.